ic*

(12) United States Patent  (10) Patent No.: US 9,055,149 B2
Camulli et al.  (45) Date of Patent:  Jun. 9, 2015

(54) MANAGING, DIRECTING, AND QUEUING COMMUNICATION EVENTS USING IMAGE TECHNOLOGY

(75) Inventors: Eric I. Camulli, Copley, OH (US); Mark J. Williams, North Canton, OH (US); Larry Miner, Bath, OH (US)

(73) Assignee: Virtual Hold Technology, LLC, Akron, OH (US)

( * ) Notice: Subject to any disclaimer, the term of this patent is extended or adjusted under 35 U.S.C. 154(b) by 239 days.

(21) Appl. No.: 13/479,870

(22) Filed: May 24, 2012

(65) Prior Publication Data

US 2012/0295596 A1  Nov. 22, 2012

Related U.S. Application Data

(63) Continuation-in-part of application No. 12/320,517, filed on Jan. 28, 2009, now Pat. No. 8,213,911.

(51) Int. Cl.
*H04M 3/42* (2006.01)
*H04M 3/523* (2006.01)
*G06Q 10/02* (2012.01)

(52) U.S. Cl.
CPC .............. *H04M 3/5231* (2013.01); *G06Q 10/02* (2013.01); *H04M 3/5238* (2013.01); *H04M 2207/18* (2013.01)

(58) Field of Classification Search
CPC . H04M 3/5231; H04M 3/5238; H04M 3/523; H04M 2207/18; G06Q 10/02
USPC ............. 379/266.01, 265.02, 210.01, 265.09, 379/265.11, 265.01, 266.06, 266.03, 379/265.14, 218.01, 309; 455/415, 406, 455/418, 445, 514, 517, 566; 705/7.13, 705/7.19, 304
See application file for complete search history.

(56) References Cited

U.S. PATENT DOCUMENTS 5,692,033 A   11/1997  Farris
6,064,730 A   5/2000   Ginsberg
(Continued)

FOREIGN PATENT DOCUMENTS

KR   10-2003-0056994        7/2003
KR   10-2004-0104097 A     12/2004
(Continued)

OTHER PUBLICATIONS

International Search Report issued Sep. 18, 2010, in related foreign application under the WIPO, Application No. PCT/US2010/000238.
(Continued)

*Primary Examiner* — Dinh P Nguyen
(74) *Attorney, Agent, or Firm* — Andrews Kurth LLP; Aldo Noto; Scott Bloebaum

(57) ABSTRACT

Embodiments of a system and method are disclosed for initiating a call-back sequence using image technology. Embodiments include capturing an image using an image sensor, sending the captured image to a communication system, searching a database of images for persons corresponding to the captured image, sending a request in a data format to the communication system for a connection with the persons, receiving an identification of active queues, displaying an indication of the active queues on a display screen using a session queuing component, obtaining a user selection of a queue as a selected queue using the session queuing component, sending a request to the communication system in a data format for expected wait time, receiving the expected wait time from the communication system, and sending a confirmation to the communication system in a data format for a call-back.

39 Claims, 14 Drawing Sheets

(56) References Cited

U.S. PATENT DOCUMENTS

| | | | |
|---|---|---|---|
| 6,192,050 B1 * | 2/2001 | Stovall | 370/389 |
| 6,405,049 B2 * | 6/2002 | Herrod et al. | 455/517 |
| 6,535,601 B1 | 3/2003 | Flockhart et al. | |
| 6,563,921 B1 | 5/2003 | Williams et al. | |
| 6,879,683 B1 | 4/2005 | Fain et al. | |
| 7,068,775 B1 | 6/2006 | Lee | |
| 7,426,267 B1 | 9/2008 | Caseau | |
| 8,010,706 B1 | 8/2011 | Rein et al. | |
| 8,256,922 B2 * | 9/2012 | Futami | 362/249.02 |
| 2002/0007295 A1 * | 1/2002 | Kenny et al. | 705/7 |
| 2002/0065759 A1 | 5/2002 | Boies et al. | |
| 2002/0193119 A1 | 12/2002 | Goss et al. | |
| 2003/0012558 A1 | 1/2003 | Kim et al. | |
| 2003/0093167 A1 | 5/2003 | Sim | |
| 2003/0133558 A1 | 7/2003 | Kung et al. | |
| 2003/0195753 A1 | 10/2003 | Homuth | |
| 2003/0235287 A1 | 12/2003 | Margolis | |
| 2004/0196856 A1 | 10/2004 | Bondarenko et al. | |
| 2005/0018849 A1 | 1/2005 | Rodriguez et al. | |
| 2005/0093986 A1 * | 5/2005 | Shinohara et al. | 348/208.1 |
| 2005/0175167 A1 | 8/2005 | Yacoub et al. | |
| 2005/0233733 A1 | 10/2005 | Roundtree et al. | |
| 2006/0012810 A1 | 1/2006 | Postle et al. | |
| 2006/0182243 A1 | 8/2006 | Yun | |
| 2006/0258397 A1 * | 11/2006 | Kaplan et al. | 455/556.1 |
| 2007/0116230 A1 | 5/2007 | Brandt et al. | |
| 2007/0160076 A1 | 7/2007 | Faber et al. | |
| 2007/0274495 A1 | 11/2007 | Youd et al. | |
| 2008/0063180 A1 | 3/2008 | Barsness et al. | |
| 2008/0144827 A1 | 6/2008 | Davis et al. | |
| 2008/0195456 A1 * | 8/2008 | Fitzpatrick et al. | 705/9 |
| 2009/0119599 A1 * | 5/2009 | Hazen | 715/738 |
| 2010/0008265 A1 * | 1/2010 | Freer | 370/259 |
| 2011/0184646 A1 * | 7/2011 | Wong et al. | 701/300 |
| 2011/0288962 A1 * | 11/2011 | Rankin et al. | 705/27.1 |
| 2012/0085829 A1 * | 4/2012 | Ziegler | 235/493 |
| 2012/0150565 A1 * | 6/2012 | Gordon et al. | 705/3 |
| 2013/0053002 A1 * | 2/2013 | Hymes | 455/414.1 |

FOREIGN PATENT DOCUMENTS

| | | |
|---|---|---|
| KR | 10-0612440 B1 | 8/2006 |
| KR | 10-0765967 | 10/2007 |
| WO | WO 00/44159 A1 | 7/2000 |
| WO | WO2004/081720 A2 | 9/2004 |

OTHER PUBLICATIONS

International Search Report issued Oct. 12, 2010, in related foreign application under the WIPO, Application No. PCT/US2010/000239.

* cited by examiner

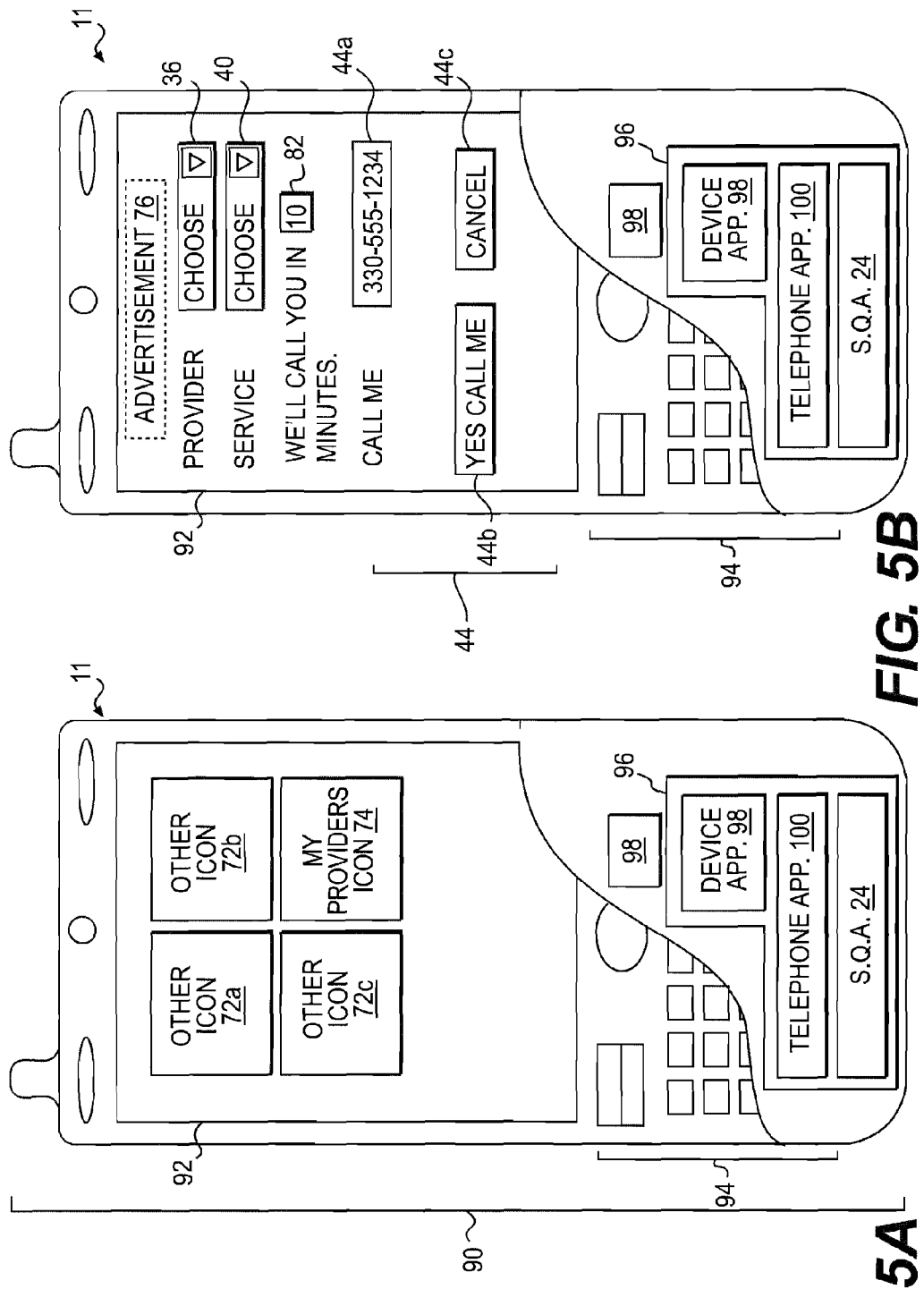

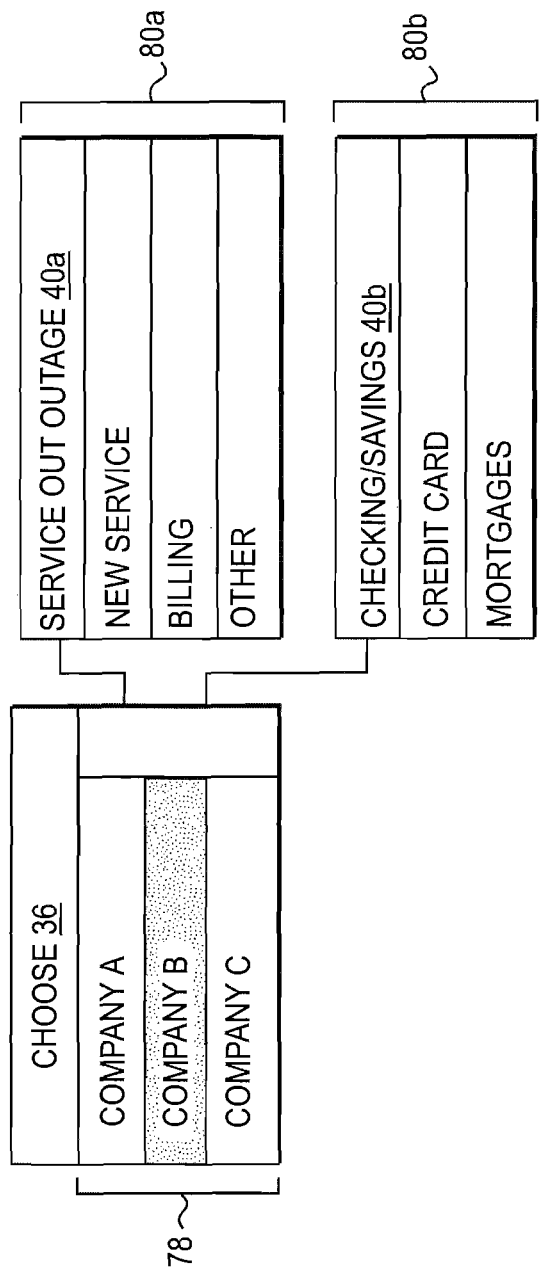

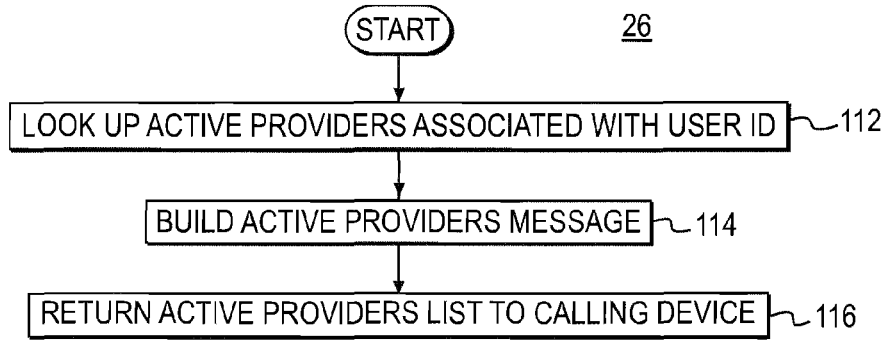
FIG. 8A
| USER ID 204 | ACTIVE PROVIDERS 206 |
|---|---|
| JOHN DOE | COMPANY A, COMPANY B, COMPANY C |
| JANE DOE | COMPANY B, COMPANY C, COMPANY D |
| ... | ... |
FIG. 8B
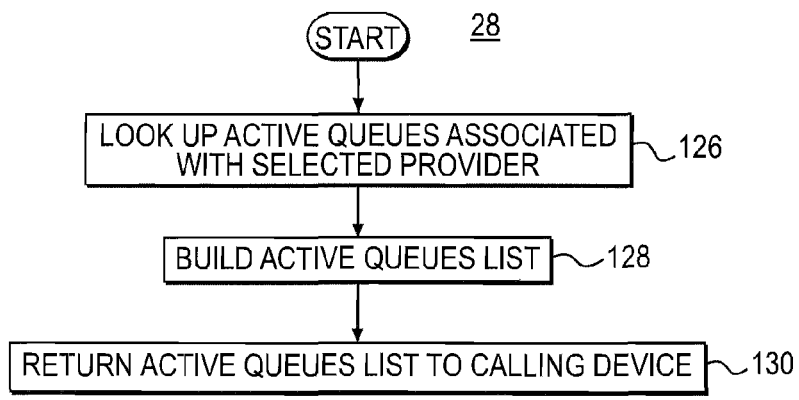
FIG. 8C

| COMPANY ID 212 | ACTIVE QUEUES 214 |
|---|---|
| COMPANY A | SERVICE OUTAGE, NEW SERVICE, BILLING, OTHER |
| COMPANY B | CHECKING/SAVING, CREDIT CARD, MORTGAGES, OTHER |
| COMPANY C | NEW RESERVATION, EXISTING RESERVATION, ACCOUNT, OTHER |
| COMPANY D | SERVICE A, SERVICE, B, SERVICE C, OTHER |
*FIG. 8D*
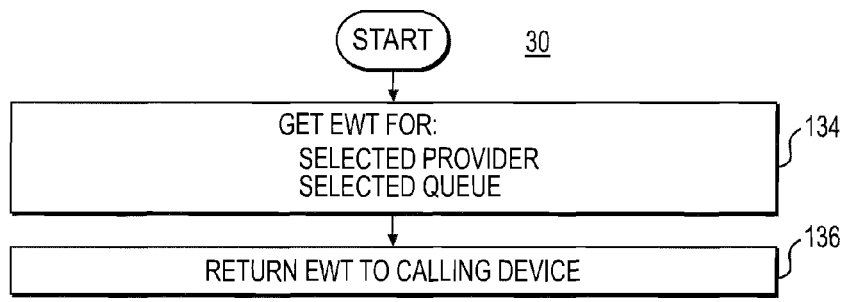
*FIG. 8E*
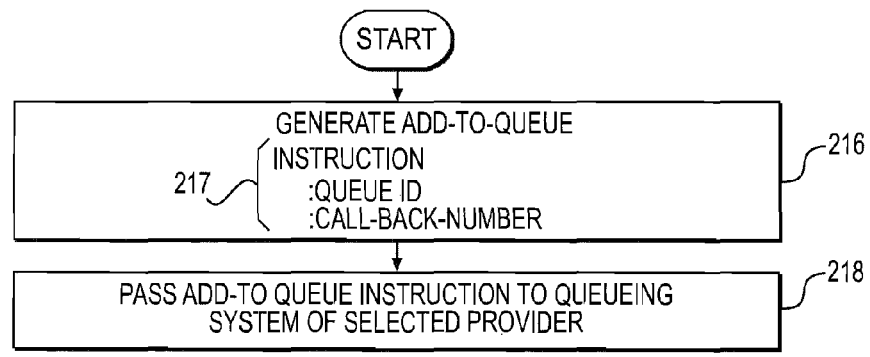
*FIG. 8F*

MANAGING, DIRECTING, AND QUEUING COMMUNICATION EVENTS USING IMAGE TECHNOLOGY

RELATED APPLICATION

This application is a continuation-in-part application of U.S. application Ser. No. 12/320,517, filed on Jan. 28, 2009, entitled "A MOBILE COMMUNICATION DEVICE FOR ESTABLISHING AUTOMATED CALL BACK," which is herein incorporated by reference in its entirety.

TECHNICAL FIELD

The systems and methods relate to managing the queuing of clients waiting to be connected by telephone to a service agent of a business communication center. More particularly, the systems and methods relate to enabling clients to be added to a queue utilizing web service messaging and relate to establishing a telephony connection between clients and service agents on an automated basis and in an order maintained by a queue.

BACKGROUND

Many businesses use groups of service representatives for communicating with clients who initiate communications with the business, such as by telephone calls. To most efficiently use the time and skills of each service representative, the service representatives may be organized into groups based on a skill set. For example, the groupings may be based on the representative's ability to handle client issues such as the opening of new accounts, billing issues and customer service issues on existing accounts.

Typically, if a client calls such a business, voice prompt menu choices enable the calling client to identify the issue for which the client requires service and the client is then queued for a service agent capable of handling the identified issue. As such, it is expected that clients who identify the purpose of their call as a "billing issue" will be queued for, and connected to, a service representative with the ability to handle billing issues. Similarly, it is expected that clients who identify the purpose of their call as a "customer service issue" will be queued for, and connected to, a service representative with the ability to handle customer service issues.

There are problems with existing communications systems, such as contact centers, including the following two problems. First, the voice prompt menus that are used to channel callers to the queue for the appropriate group of service agents are exacerbating to a client at best. It takes significant time to navigate the layered menus of voice prompts.

Second, waiting on-hold while the telephone connection is maintained in queue for connection to a service agent is also exacerbating to a client at best.

In an effort to reduce customer exacerbation caused by having to maintain a connection while on-hold in queue, secondary queue systems have been developed. A typical secondary queue system obtains a telephone number at which the calling client can be reached when a service representative is available (i.e., a call back number). The client disconnects, and then, at the proper time, a call back system establishes a connection to the client utilizing the call back number and couples the client to an available representative without waiting on-hold in queue. One exemplary system is disclosed in U.S. Pat. No. 6,563,921 to Williams et al. which is commonly assigned with the present application.

While such a system may make the experience of waiting for a connection to a service representative slightly less exacerbating, it does not address the inconvenience of having to navigate an irritatingly slow and usually complicated voice prompt menu to enter the queue.

SUMMARY

An embodiment of a system is disclosed for initiating a voice call-back sequence using image technology. The system includes an image sensor that captures an image, and a processor configured to execute a device application. The device application includes a first routine that sends the captured image to a communication system that searches a database of images for one or more persons corresponding to the captured image, and a second routine that receives from the communication system an identification of one or more active queues. The device application further includes a session queuing component that causes an indication of the one or more active queues to be displayed on a display screen of a communication device and obtains a user selection of a queue as a selected queue. The session queuing component resides within the communication device. The device application further includes a third routine that sends a confirmation in a data format for a voice call-back to the communication system.

An embodiment of a method is disclosed for initiating a call-back sequence using image technology. The method includes capturing an image using an image sensor on a communication device, sending the captured image to a communication system that searches a database of images for one or more persons corresponding to the captured image, sending a request in a data format to the communication system for a connection with the one or more persons, receiving an identification of one or more active queues, and displaying an indication of the one or more active queues on a display screen of the communication device using a session queuing component that resides within the communication device. The method further includes obtaining a user selection of a queue as a selected queue using the session queuing component, and sending a confirmation to the communication system in a data format for a call-back.

An embodiment of a non-transitory computer readable medium is disclosed for storing computer executable instructions for initiating a call-back sequence using image technology. The computer executable instructions include capturing an image using an image sensor, sending the captured image to a communication system that searches a database of images for one or more persons corresponding to the captured image, receiving from the communication system an identification of one or more active queues, and displaying an indication of the one or more active queues on a display screen of the communication device using a session queuing component that resides within the communication device. The computer executable instructions further include obtaining a user selection of a queue as a selected queue using the session queuing component, and sending a confirmation to the communication system in a data format for a call-back.

BRIEF DESCRIPTION OF THE DRAWINGS

FIG. 5A is an exemplary communication device adapted for operation;

FIG. 5B is an exemplary communication device adapted for operation in accordance with an exemplary embodiment of the present invention;

FIG. 6 is a table representing an exemplary provider control and an exemplary service control in accordance with an exemplary embodiment of the present invention;

FIG. 8A is a flow chart representing exemplary operation of an active providers service or method in accordance with an exemplary embodiment of the present invention;

FIG. 8B is an exemplary active providers data storage in accordance with an exemplary embodiment of the present invention;

FIG. 8C is a flow chart representing exemplary operation of an active queues service or method in accordance with an exemplary embodiment of the present invention;

FIG. 8D is an exemplary active queues data storage in accordance with an exemplary embodiment of the present invention;

FIG. 8E is a flow chart representing exemplary operation of an expected wait time service or method in accordance with an exemplary embodiment of the present invention; and FIG. 8E is a flow chart representing exemplary operation of an expected wait time service or method in accordance with an exemplary embodiment disclosed herein;

FIG. 8F is a flow chart representing exemplary operation of an add-to-queue method in accordance with an exemplary embodiment disclosed herein;

DETAILED DESCRIPTION

Figure 1:
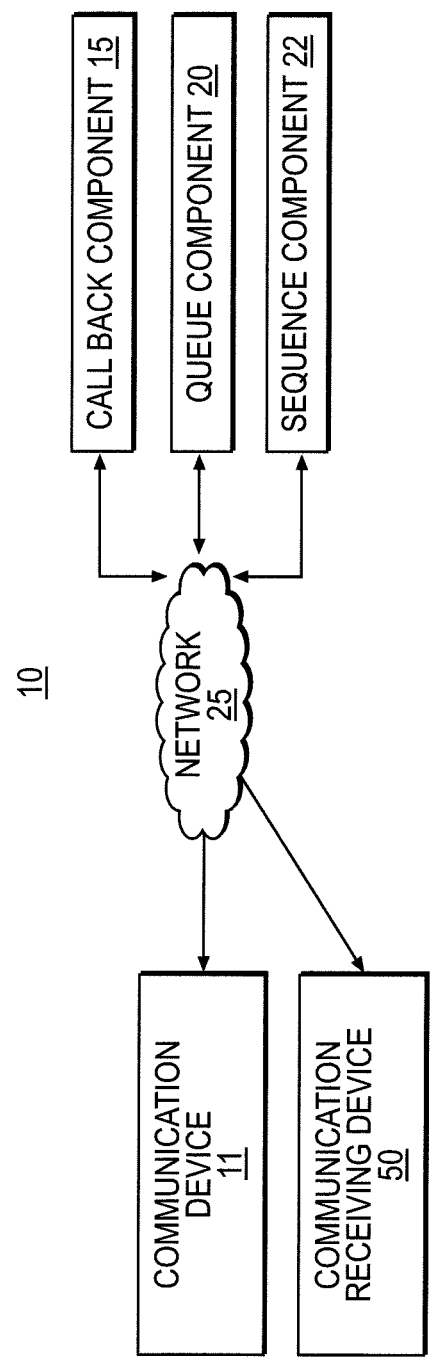
FIG. 1 is a block diagram representing an exemplary architecture of a system for sequencing communication devices in a selected queue of a selected provider.

The present invention will now be described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

It should also be appreciated that many of the elements discussed in this specification may be implemented in a hardware circuit(s), a processor executing software code which is encoded within computer readable media accessible to the processor, or a combination of a hardware circuit(s) and a processor or control block of an integrated circuit executing machine readable code encoded within a computer readable media. As such, the term circuit, module, server, or other equivalent description of an element as used throughout this specification is intended to encompass a hardware circuit (whether discrete elements or an integrated circuit block), a processor or control block executing code encoded in a computer readable media, or a combination of a hardware circuit(s) and a processor and/or control block executing such code.

It should also be appreciated that the table structures represented in this application are exemplary only and intended to show the mapping of relationships between various data elements. Other table structures may store similar data elements in various manners. Further, the applicant's use of the term "plurality" is intended to indicate not just "at least one", but one, two, three, or any other quantity. The applicant's use of the term "group" is intended to indicate not just "at least one", but two, three, or more of the items within the group.

FIG. 1 is a high level schematic illustration of a system 10 for placing a communication device 11 in a queue and calling a communication receiving device 50. The system 10 includes the communication device 11, a network 25, a call back component 15, a queue component 20, a sequence component 22, and the communication receiving device 50.

The system 10 assigns a placeholder for a communication device 11 (or an identifier for a communication device 11 such as its telephone number or other unique network identifier) in a selected queue (not shown in FIG. 1) of the queue component 20. The system uses a sequence component 22 to execute a call back sequence to a communication receiving device 50. When prompted, the call back component 15 places an outgoing call to a communication receiving device 50. The outgoing call attempts to establish a voice connection with the communication receiving device 50.

The communication receiving device 50 may be any device that can receive a telephone call. The communication receiving device 50 is often the communication device 11 that sent the initial data requesting a telephone connection.

In some embodiments, prior to allowing communication between a communication device 11 and the system 10, the system 10 performs one or more security checks. These security checks can be performed for a variety of purposes including ensuring that the software on the communication device 11 is authentic and valid for use on the device and that the device is authorized. Various software routines may be used by the system 10 and the communication device 11 to perform security checks. Encryption keys may be assigned to the communication devices 11 and used for the security check.

In an embodiment, the identifier for a communication device 11 is an encryption key. Each software application for communicating with the system 10 on a communication device 11 may have one or more unique encryption keys that are recognized by the system 10.

The network 25 (depicted by a cloud) can be any one or more of a variety of networks. The system 10 shown can support many communication devices 11 of various types and many queues (not shown in FIG. 1). The communication device 11 may communicate with the other components through the network using available techniques.

The communication device 11 may be a mobile communication device, such as a cellular telephone. The communication device 11 may also be a non-mobile device, such as a home entertainment device, a kiosk, or a point of purchase device.

Figure 2:
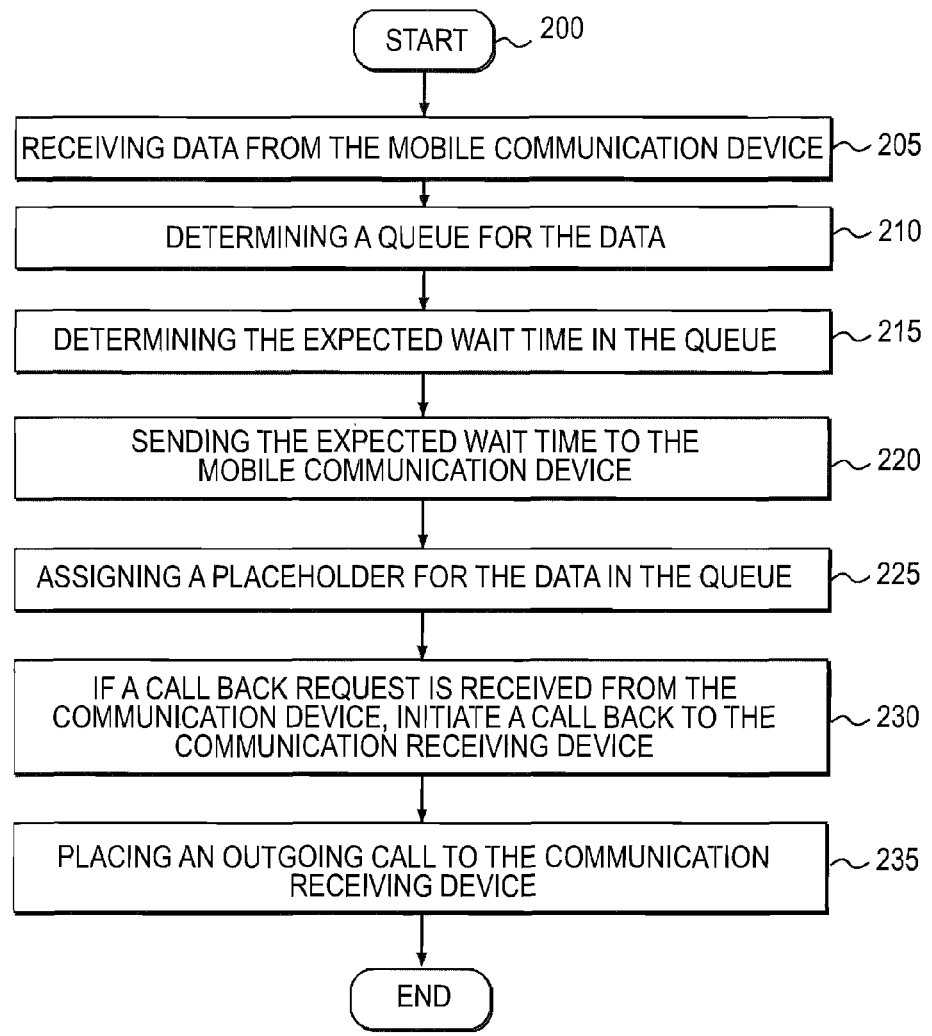
FIG. 2 is a flow-chart of a method for call back sequencing.

Referring now to FIG. 2, shown is a flow chart of an exemplary embodiment of a method for initiating a call-back sequence in a communication system, such as a call center or contact center, for example. The method 200 includes receiving data from a communication device 11 (205), determining a queue for the data (210), determining the expected wait time in the queue (215) for the data and sending the expected wait time in the queue to a communication device 11 (220). The method further includes assigning a placeholder for the data in the queue (225). If a call back request is received from the communication device 11, the method includes initiating a call back to a communication receiving device 50. The method further includes placing an outgoing call to a communication receiving device 50 (235). The steps of the method may be performed in various different orders or chronology.

As noted above, the communication receiving device 50 may be any device that can receive a telephone call. The communication receiving device 50 is often the communication device 11 that sent the initial data requesting a telephone connection.

Figure 3A:
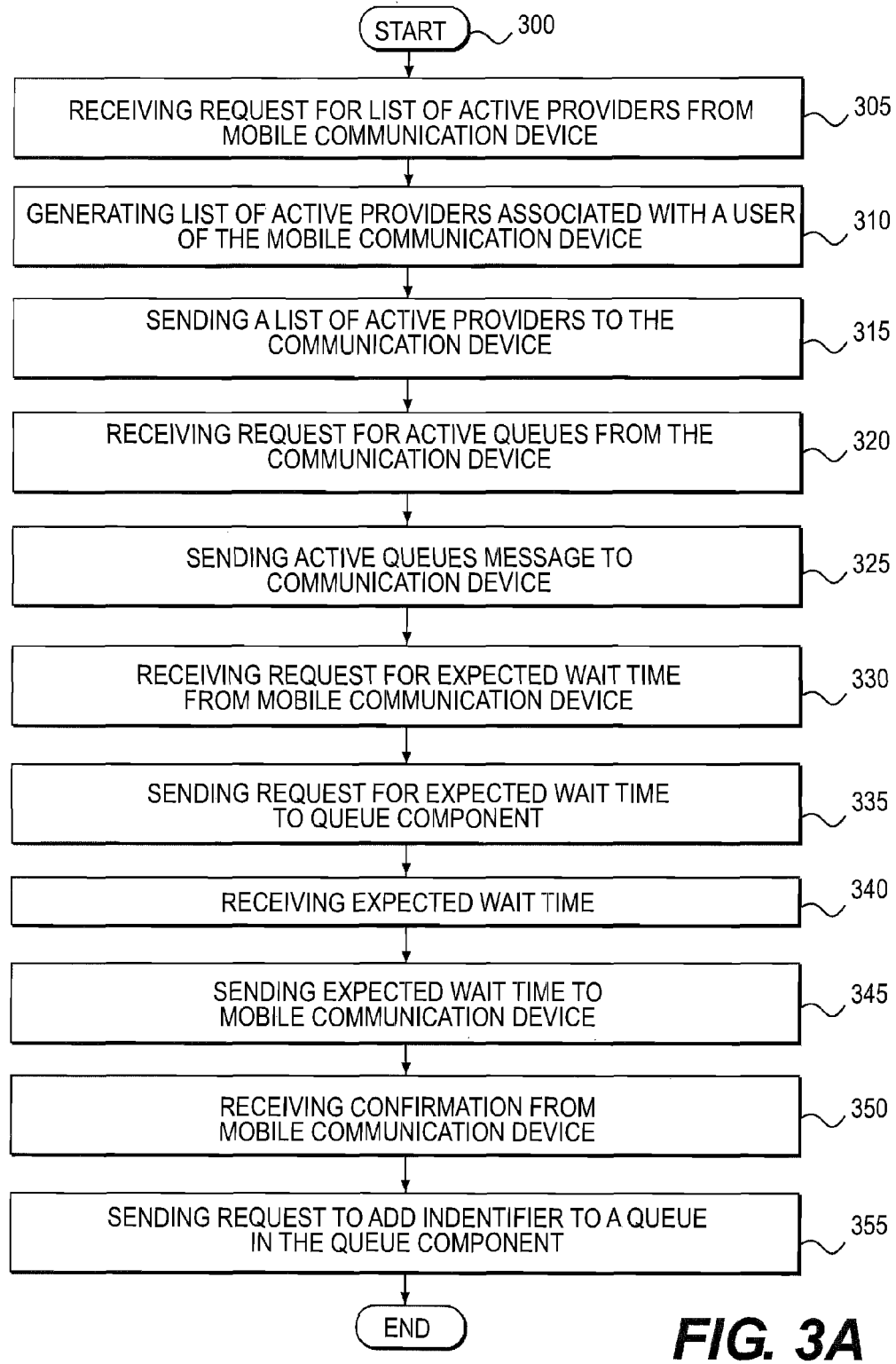
FIG. 3A is a flow-chart of a method for assigning a placeholder in a queue for a call back to a communication device.

FIG. 3A is a flow chart of an embodiment of a method 300 for assigning a placeholder in a queue for a call back to a communication device 11 in a communication system. The description of the method 300 in FIG. 3A also references components and routines found in FIG. 3B. The method 300 of FIG. 3A includes the sequence component 22 receiving a request for a list of active providers from a communication device 11. This may be in the form of an active provider remote processing call 48 from a provider client routine 34 (305). The provider client 34 is a routine which is part of the session queuing component 24. The active provider remote processing call 48 originates from the communication device 11 and serves as the request for a list of active providers. The active providers may be associated with a user of the communication device 11. Upon receipt of the active provider remote processing call 48, the sequence component 22 launches an active provider routine 26. The routine generates a list of active providers associated with the user (310) of the communication device 11.

The method 300 further includes active provider routine 26 sending a list of active providers to the communication device 11 via an active providers message 50. More particularly, the provider client routine 34 in the session queuing component 24 receives active providers message 50 (315).

The method 300 further includes receiving a request for active queues in the queue component 20 via an active queue remote processing call 52 from the communication device 11 (320). The active queue remote processing call 52 serves as a request for a listing of active queues associated with the selected provider to an active queue routine or process 28 of the sequence component 22. The listing is populated into the service control 40 of the session queuing component 24.

The exemplary method 300 of FIG. 3A further includes sending active queues, via an active queues message 54, from active queue routine 28 to service client routine 38. The service client routine 38 in this example is resident on the communication device 11 (325). The active queues message 54 includes active queues wherein an identifier of a communication device 11 may be placed.

The method 300 further includes receiving a request for the expected wait time for receiving a call back from a provider. The expected wait time may be received via an expected wait time call 56 from the communication device 11 (330). Upon the user selecting a queue using the service control 40, the expected wait time client 42 generates an expected wait time call 56 to the sequence component 22. The method 300 includes the expected wait time routine 30 sending a request 62 for the expected wait time to the expected wait time component 18 (within the queue component 20) (335) and receiving the expected wait time 64 (340) from the expected wait time component 18.

With continuing reference to FIG. 3A, the method 300 further includes sending an expected wait time message 58 to the communication device 11 (345). More particularly, the expected wait time message 58 is sent from the expected wait time routine 30, of the sequence component 22, to an expected wait time client 42 of the session queuing component 24. The method 300 further includes receiving a confirmation call 60 from the communication device 11. More particularly, the confirmation call originates from confirmation client 46 (part of the session queuing component 24) and is sent to the confirmation routine 32 (350) of the sequence component 22. The method 300 further includes sending a request via a message 66 to the queue component 20 to add user's identifier to the selected queue (355).

Figure 3B:
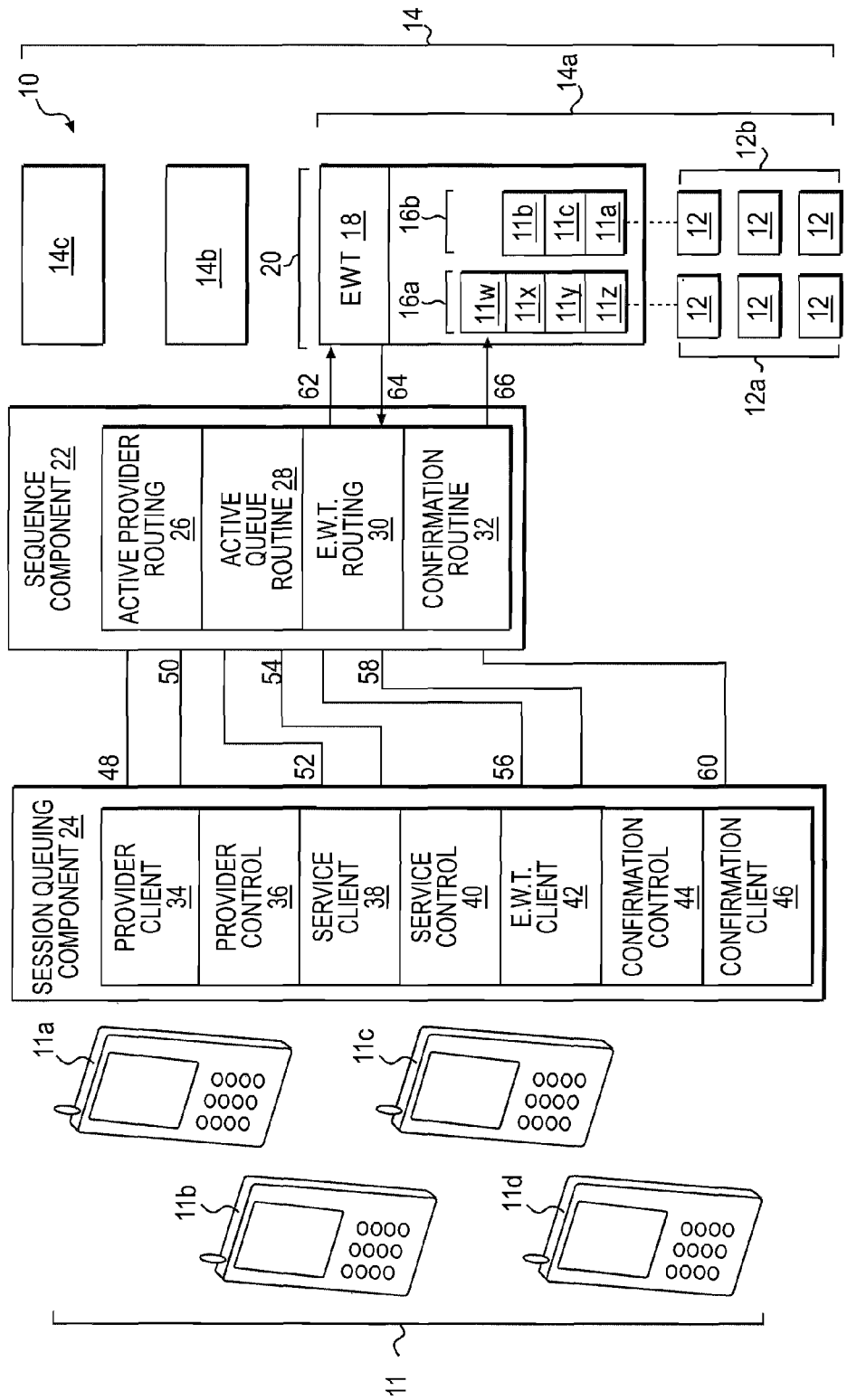
FIG. 3B is a block diagram representing an exemplary architecture of a system for sequencing communication devices in a selected queue of a selected provider.

FIG. 3B is a schematic diagram of an embodiment of a telephone based system 10 showing multiple communication devices 11a-11d and multiple business communication centers 14a-14c. Each business communication center 14a-14c is typically associated with a company for which the business communication center 14a-14c is operated. The system 10 includes sequence component 22 and a session queuing component 24. The sequence component 22 performs the call back sequencing of the communication devices 11a-11d. The session queuing component 24 resides within a communication device 11 and can be loaded onto each communication device 11a-11d.

With continuing reference to FIG. 3B, each business communication center (using business communication center 14a for reference) may be associated with a company and comprise a group of service agents 12. Each of the service agents 12 may be a service representative system for enabling a service representative to service a client. More specifically, the service representative may participate in an audio or audio/video session with a communication device 11 and service the requests of each client, or routine, of the session queuing component 24. The service agents 12 may be organized in a single service agent set grouped into multiple service agent sets based on the skill set of service agent operators (e.g., the operators of the service agents 12 at a communication system).

In an embodiment, the business communication center 14a has at least one computer system including a processor operating the queue component 20, and memory. In general, the queue component 20 is adapted to maintain a group of queues 16a, 16b with each queue 16a, 16b being associated with one of sets 12a, 12b of the group of service agents 12. For example the set of service agents 12a may be associated with queue 16a while the second set of service agents 12b may be associated with queue 16b. In an embodiment, the queue component 20 identifies a sequential order of the devices 11w, 11x, 11y, and 11z, which are queued for connection to one of the service agents 12.

Expected wait time component 18 is adapted to determine an expected wait time value representing the time at which service agents 12 within the particular service agent group are expected to be available to service a client. The expected wait time can be calculated or determined in a number of different ways.

The expected wait time value may represent an estimated wait time calculated using primary estimated wait time techniques such as projecting a wait time based on the quantity of clients in the queue and any of a historical, present, or projected time allotment for handling each such queued client. Alternatively, the expected wait time value may be a function of both a primary estimated wait time calculation and a wait time augmentation calculation made based on service agent availability and/or scheduled change in service agent availability as disclosed in co-pending patent application Ser. No. 11/143,857 filed on Jun. 2, 2005 and assigned to the same assignee as the present invention. Such patent application is incorporated herein by reference.

The sequence component 22 may be embodied as a web services server. In one embodiment, the sequence component is connected to the internet and includes appropriate web services messaging systems (i.e., Simple Object Access Protocol or SOAP) for communicating with the session queuing component 24 on the devices 11a-11d. In an embodiment, the sequence component 22 communicates with queue component 20.

The sequence component 22 may include a processor (not shown) for executing the web services messaging systems as well as other applications stored on a memory (not shown). Such other applications may comprise an active provider routine 26, an active queue routine 28, an expected wait time routine 30, and a confirmation routine 32.

The session queuing component 24 may include a number of routines including for example, a provider client 34, a company or provider control 36, a queue or service client 38, a queue or service control 40, an expected wait time client 42, a confirmation control 44 and a confirmation client 46.

It should be appreciated that each of the routines of the session queuing component 24 are exemplary and for illustrative purposes. Those skilled in the art will recognize that the systems and functions of each routine described herein may be implemented by way of other permutations of components and sub systems.

In an embodiment, the session queuing component 24 may be an embedded application of a communication device 11. In another embodiment, the session queuing component may be a java script, ActiveX, or other similar structure downloaded and executed by a browser and an applicable browser plug-in executing on the telephone 11.

In this embodiment, the session queuing component 24 may include a combination of the java script or ActiveX control and components of the browser and/or the plug-in, which in combination drive operation of the session queuing component 24.

In an embodiment, the session queuing component 24 communicates with the sequence component 22 using web service messages and internet protocol. In an embodiment, the session queuing component 24 obtains user selection of a provider (from a group of providers) with which the user desires to communicate via a telephone communication session. The session queuing component 24 may also obtain user selection of a service of the selected provider (from a group of services) and an estimated wait time representing a duration of time the user can be expected to wait until connecting to the selected services. Session queuing component 24 confirms, after presenting the expected wait time to the user, that the user desires to connect to a service agent 12. More specifically, it confirms that the user wishes to speak with a particular type of service agent 12. The session queuing component 24 assists in placing the user in a queue for the user to receive a call back from the service agent 12 at a connection time.

The connection time may be when the user reaches the first position in the queue (i.e., after other clients in the selected queue prior to the client have all been connected to available service agents or abandoned their position in the queue selected) and a service agent becomes available, or at a specific scheduled time. The specific scheduled time may be a time calculated by adding the expected wait time to the time at which the expected wait time was presented to the user. The specific scheduled time may also be a time selected by the user.

The term "provider" is used interchangeably with the term "business communication center" or the "provider's business communication center" within this application, and the term "queue" is used interchangeably with the term "service" or the "queue for connection to a service agent providing the selected service."

Figure 4:
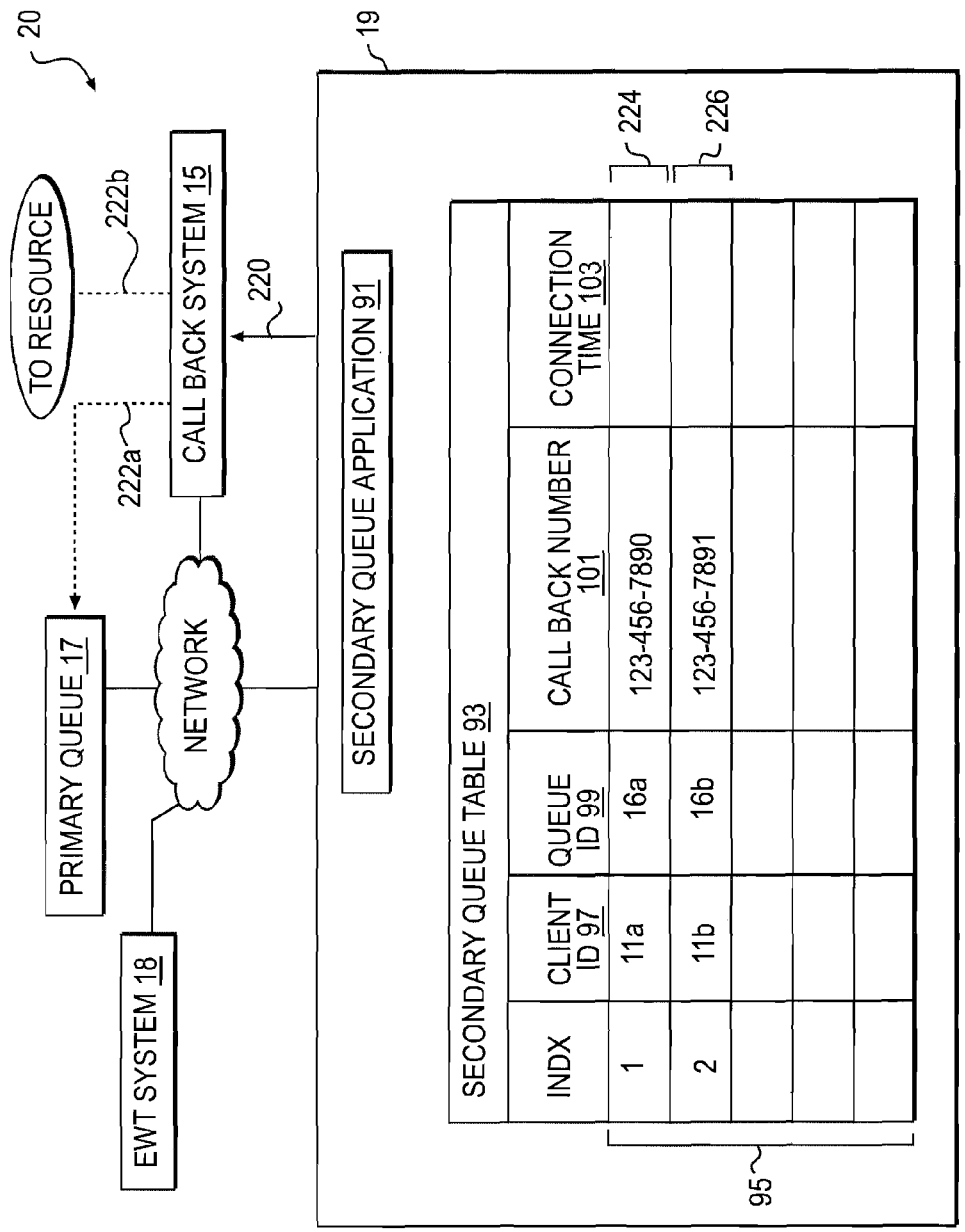
FIG. 4 is a block diagram of an exemplary queue component.

FIG. 4, is a block diagram of an embodiment of queue component 20. The queue component 20 may include primary queue 17 (ACD) adapted to queue communication devices 11 while maintaining the telephony connection (e.g., communication devices "on-hold"), a secondary queue component 19, a call back component 15 adapted to establish a telephony connection to communication device 11 for which a telephony connection is not maintained by the primary queue 17, and an expected wait time component 18.

The primary queue 17 may be embodied in a primary automated call director (ACD). In an embodiment, the ACD places in a queue client telephone connections which are "on-hold" waiting for a service agent 12. Such an ACD may use known technology adapted to (1) receive incoming calls from the communication device 11 (e.g., establishing a client connection with each) (2) identify which group of service agents the caller desires to connect (including using primary voice prompts) and (3) place the call in a queue for connection to the identified service agent group. If one of the service agents 12 within a service agent group becomes available, the ACD connects a next client connection from the queue to the available service agent 12.

The secondary queue component 19 may be coupled to a primary queue 17 as an accessory device. The secondary queue component 19 maintains the queue position of the communication device 11 in a manner that does not require the communication device 11 to remain "on hold" or otherwise maintain an active telephone connection with the primary queue 17. More specifically, for a communication device 11 calling the communication center utilizing the primary queue 17, the secondary queue component 19 may (1) obtain a network address for the communication device 11 (e.g., a telephone network call back telephone number or other telephone network address) and (2) write the network address of the telephone connection to a record of the queuing table (for example record 224 in the event a user of communication device 11a calls the communication center in a primary manner). Further, the secondary queue component 19 may, at the appropriate connection time, (3) induce the call back system 15 to establish a connection to the communication device 11 utilizing the call back number. Inducing the call back system 15 to establish the connection may include generating a call back message 220 to the call back system 15.

The secondary queue component 19 may also (e.g., communication devices 11 being added to a queue utilizing telephone system 10), obtain a network address of a telephone connection to the communication device 11 (e.g., a telephone network call back telephone number or other telephone network address) via the messaging discussed above with respect to messages 62, 64, and 66 in FIG. 3B. The secondary queue component 19 may write the network address of the telephone connection to a record of the queuing table (for example record 226 in the event a user of communication device 11b utilizing system 10 for being added to queue 16a), and at the appropriate connection time, induce the call back system 15 to establish a connection to a communication device 11 utilizing the call back number. Inducing the call back system 15 to establish the connection may include generating a call back message 220 to the call back system 15. The call back message 220 may include identification of the telephone number to which the call back system 15 is to establish a telephone connection and identifying the queue

16a, 16b and/or service agent group 12a, 12b to which the telephone connection is to be connected.

After the call back system 15 has established a connection with the communication device 11, it may generate a priority connection to the available service agent 12 within the appropriate service agent group 12a, 12b. The priority connection 222 may be a transfer 222a of the communication device 11 connection to the primary queue 17. Transfer 222a may occur via a command such that the primary queue 17 connects the client to the next available one of the service agents 12 within the required service agent group 12a-12b (e.g., places the client at the front of the queue). The priority connection 222 may also be a connection 222b directly to the next available service agent 12, bypassing primary queue 17.

The secondary queue system 19 may comprise a secondary queue application 91 and a secondary queue table 93. The secondary queue table 93 maintains, for each communication device 11 being handled by the secondary queue component 19, call back information. In more detail, secondary queue table 93 may comprise a plurality of records 95. Each record 95 associates a client identifier 97 with a call back telephone number 101 (or other network identifier) to which a telephone connection may be established with the subject communication device 11, or other communication receiving device 50 at a connection time 103. Secondary queue table 93 may also include a service agent ID 99 identifying the service agent 120, or subset of the group of service agents to which the client 11 is to be connected.

In one aspect, the secondary queue application 91 monitors the passage of time and, upon determining that time has advanced to the connection time 103 of one of the records 95 of the secondary queue table 93, drives the call back system 15 to establish a telephony connection to the subject client. Again, the telephony connection may be a primary PSTN connection or a telephony connection using an alternative technology such as VoIP.

After establishing the telephony connection, the priority connection to a service agent 12 within the required service agent group is generated.

The expected wait time component 18 may be part of the secondary queue system 19, part of the primary queue (ACD) 17, or a separate accessory system interoperating with the secondary queue system 19 and the primary queue (ACD) 17.

Referring now to FIG. 5A, each device 11 may include user interface 90 inclusive of display screen 92 and controls 94 (such as keys, touch panel, or other controls) for operation of controls rendered on the display screen (keys are represented), memory 96, and processor 98 for executing applications encoded in the memory 96.

The applications encoded in memory 96 may include a telephone application 100, and/or appropriate systems adapted to drive operation of the user interface, and the session queuing component 24.

The telephone application 100 may be adapted to signal, establish, and maintain an audio communication session (either as the session initiator or receiver) with remote endpoint devices over compatible networks (PSTN, VoIP, and other networks utilized for audio communication sessions). The endpoint devices include the business communication center systems 14 for signaling, establishing, and maintaining audio communication sessions between each service agent 12 and the business clients, each of which may utilize one of the communication devices 11 for communication with the business.

The session queuing component 24 may include a launch object 74 rendered as a "My Providers" icon on the display screen 92 and adapted to launch operation of the session queuing component 24 upon detecting user selection of the launch object 74.

Referring now to FIG. 5B, for purposes of performing the above described functions, visible objects of the session queuing component 24 (following activation by selection of the launch icon 74 as depicted in FIG. 5A) include a provider control 36, a service control 40, and a confirmation control 44.

The confirmation control 44 may include a window 44a for confirming the identifier of a communication device 11 (i.e., the call back telephone number utilized to establish an inbound telephone call to the communication device 11 or other unique "call back" identifier used to establish an audio session with the communication device 11), an accept control object 44b and a cancel control object 44c.

In an exemplary embodiment, the telephone number of the communication device 11 may be pre-populated to the window object 44a with the window object being active to enable the user to modify the telephone number in the event he or she desires the call back to be at a different telephone station.

The cancel control object 44c may be a selection button adapted to detect user selection. Upon detecting user selection, cancel control object 44c may be adapted to terminate operation of the session queuing component.

The accept control object 44b may be a selection button adapted to launch the confirmation client 46 upon user selection.

Upon launch of the session queuing component 24 the visible objects of the session queuing component 24 may be rendered on the display screen 92 as depicted in FIG. 5B.

The provider control 36 may be rendered in an active state with the group of providers 78 (FIG. 6) populated into its drop down menu. From this menu, the user may select providers from the selected business communication center. The service control 40 is shown in an active state. The service control 40 and the confirmation control 44 may be rendered in an inactive state (i.e., rendered with no populated data, inoperable, and rendered with a gray tint to indicate the inactive state). In an embodiment, the provider client 34 (shown in FIG. 3B) populates the provider control 36 with a listing of the providers from the group of providers 78.

Referring now to FIG. 6, shown is an illustration of the provider control 36. The provider control 36 may be a drop down menu control which displays a group of providers 78. From this menu, the user may select a provider from the selected business communication center.

The service control 40 may be a drop down menu control (as represented by 40a, 40b) which displays, for the selected provider, the services/queues of a group of services/queues 80a, 80b associated with the selected provider's business communication center. A user may select a service from this menu.

Exemplary providers include Company A and Company B. For purposes of illustration, Company A may be a utility company and its services/queues associated with its business communication center may include a service/queue for reporting loss of services, a service/queue for handling billing matters, and a default service/queue for handling other matters.

Company B, for illustration, may be a bank and its services/queues associated with its business communication center may include a service for handling of checking, savings, or other deposit accounts, a service for handling credit card accounts, a service for handling mortgage accounts, and a default service for handling other matters.

Figure 7A:
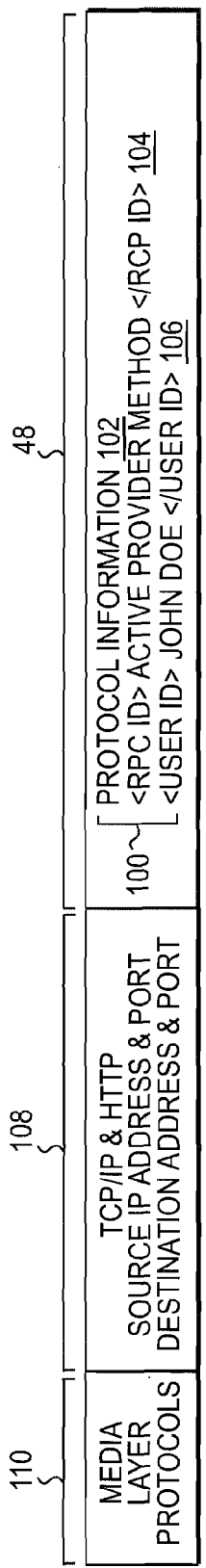
FIGS. 7A-7D represent exemplary messaging structures packaged with transport layer and media layer information.

FIG. 7A, shows an exemplary embodiment of a structure for communications or messages passing between the communication devices 11 and service providers. In this example, the structure of an active providers remote processing call 48 is shown. The structure may be an XML structure 100 with applicable SOAP or other remote processing call protocol information 102. The exemplary structure includes at least a method identifier 104, which identifies the active provider routine or process 26 as the remote process, and data arguments 106 for the active provider routine 26. The data arguments 106 may include at least identification of the user.

The remote processing call 48 may be encapsulated within appropriate TCP/IP and HTTP headers and other transport layer information 108 such as source IP address and source port number of the requesting device 11 and destination IP address and destination port number of the sequence component 22. Such combination may be encapsulated within appropriate media layer protocols 110 for transmission across physical communication media via various physical layer segments interconnecting the requesting device 11 and the sequence component 22.

Figure 7B:
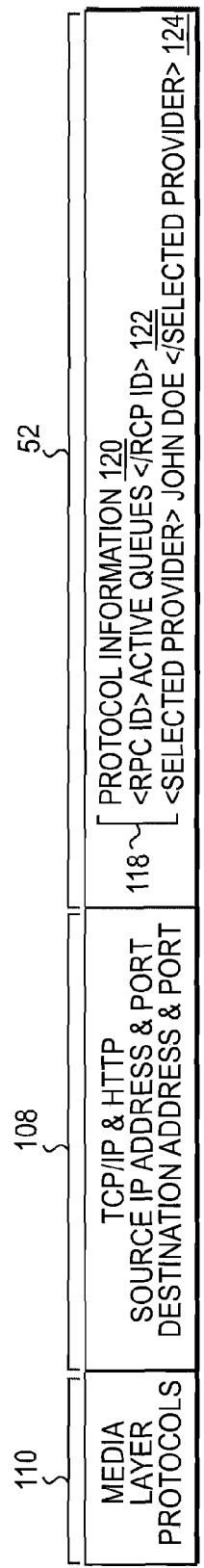
Figure 7C:
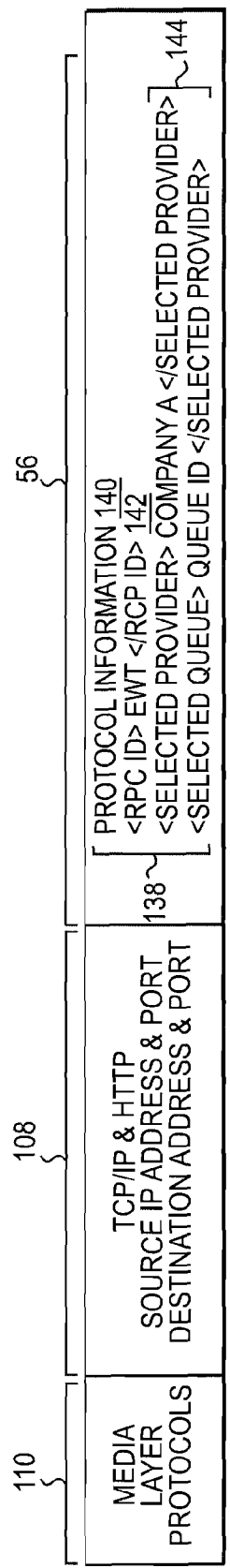
Figure 7D:
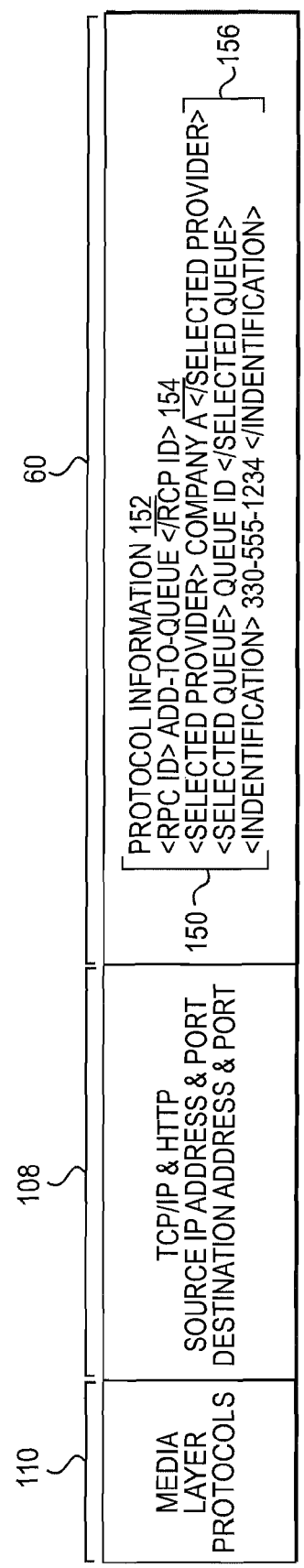

FIGS. 7B-7D show exemplary structures of other messages or communications within system 10 similar to that of active providers remote processing call 48. The other communications that may be similarly structured, encapsulated, and transported may include the active queue remote processing call 52 (FIG. 7B), expected wait time call 56 (FIG. 7C), add-to-queue remote processing call 154, the active providers message 50, the active queue message 54, the expected wait time message 58, and the confirmation remote processing call 60 (FIG. 7D), for example.

More specifically, referring to FIG. 8A and FIG. 8B, the active provider routine 26 includes a looking up (at step 112) in an active providers data store 200, a list of active providers associated with the user. The active providers data store 200 and may include a group of records 202, with each record associating a user ID 204 with identification of a group of active providers 202 associated with the user ID 204. Step 114 represents building an active providers message 50 (shown in FIG. 3A) for return to the device generating the active providers remote processing call 48 (shown in FIG. 3A).

It should be appreciated that the above described structure and processes for populating the provider control 36 is exemplary only. Those skilled in the art will also recognize that the list of providers could be obtained and stored within the communication device 11. A list of providers stored within the communication device 11 may then be used for populating both the provider control 36 and the active queue control 40. Upon a user selecting a provider from the list of active providers 78 rendered or shown within the provider control, the service client routine 38 requests a listing of active queues from the active queue routine or process 28 of the sequence component 22. The service client routine 38 populates the service control 40 with a listing of active queues associated with the selected provider.

More specifically, referring to FIG. 8C and FIG. 8D, the active queue routine or process 28 includes looking up (at step 126) in an active queues data store 208, a list of active queues associated with the selected provider. The active queues data store 208 may include a group of records 210, with each record associating a company ID 212 (identifying a provider) with identification of a group of active queues 214 associated with the company ID 212. The build active queues list (step 128) represents building an active queues message 54 (described above) for return to the device generating the active queue remote processing call 52 (described above).

Upon receipt of the active queues message 54, by service client routine 38, the service control 40 is populated by the list of active queues 80a as discussed with respect to FIG. 5B and FIG. 6.

It should be appreciated that the above described structure and processes for populating the service control 40 is exemplary only. Those skilled in the art will also recognize that lists of active queues for each provider could be obtained and stored within the communication device 11 utilizing one or more remote processing calls prior to user selection. As such, list of providers and active queues stored within the communication device 11 may then be used to populate both the provider control 36 and the active queue control 40. It is further envisioned that both the provider control 36 and the service control 40 may be combined within a single control listing combinations of a provider and a service.

More specifically, referring to FIG. 8E, the expected wait time routine or process 30 includes obtaining (at step 134) from the expected wait time component 18 associated with the selected queue of the selected provider, the expected wait time for the selected queue. Such step may include sending a remote processing call to the expected wait time component with data arguments (of the remote processing call) including identification of the selected queue. The return expected wait time to calling device (step 136) represents the expected wait time component 18 building an expected wait time message 58. The expected wait time message can then be sent to the device generating the expected wait time remote processing call 56.

Referring back to FIG. 5B, upon receipt of the expected wait time response message 58, the expected wait time value 148 identifying the expected wait time duration of time is rendered on the display screen as depicted by reference numeral 82. Following display of the identification of the duration of time, the confirmation control 44 may be activated for obtaining user input.

As discussed, the confirmation control may include a window 44a for confirming a telephone number of the communication device 11 or the communication receiving device 50 (i.e., the telephone number utilized to establish an inbound telephone call to the communication device 11 or the communication receiving device 50), a confirmation control 44b and a cancel control 44c.

In an exemplary embodiment, the telephone number of the communication device 11 may be pre-populated to the window object 44a with the window object being active to enable the user to modify the telephone number in the event he or she desires the call back to be at a different telephone station, such as the communication receiving device 50.

The cancel control 44c may be a selection button adapted to detect user selection. Upon detecting user selection, the cancel control object may be adapted to terminate operation of the session queuing component.

The accept control object 44b may be a selection button adapted to launch the confirmation client 46 upon user selection.

The confirmation client 46 (shown in FIG. 3A) may be adapted to send a confirmation remote processing call 60 to the sequence component 22 via the message structure described above. In this instance, the data arguments may include at least the identification of a telephone number or other telephone network address of the communication receiving device 50 or communication device 11 that the user desires for use in the connection to the service agent. Typically such identification will be a PSTN telephone number that the provider systems will use as a "call back number" to establish a telephone connection between the user and a service agent at the appropriate call back time.

Further, the arguments of the confirmation remote processing call may include identification of the selected provider and selected queue which the user desires to join. Alternatively, the arguments may include a session ID matched to previous remote processing calls such that the sequence component may determine the selected provider and selected queue which the user desires to join.

More specifically, referring to FIG. 8F, the confirmation routine or process 32 includes (at step 216) generating an add-to-queue instruction 217. The instruction may include for example, a queue ID of the selected queue and the call back number (e.g., the telephone network identifier of the communication receiving device 50) in a format compatible for transmission to the selected business communication center's systems. The step 218 of passing the add-to-queue instruction 217 to the queue component 20 of the selected provider is shown in FIG. 8F. This step includes packaging the SOAP formatted add-to-queue instruction with applicable transport layer and media layer for transmission as discussed above. Upon receipt, the queue component 20 of the selected provider may add the user to the selected queue.

Current image technology can be integrated with search engines. For example, eBay's image recognition integration application allows a mobile telephone user to take a photo of an item on the mobile telephone, and then matches the photo with similar products currently on sale on a company's website. This image recognition integration application provides great convenience for a user because the user can point, click, upload, and find the product the user desires using an image search.

Similarly, SnapTell's visual product search technology allows a user to take a photo of the cover of any CD, DVD, book, or video game, and automatically identifies the product, and finds ratings and pricing information online from Google, Amazon, eBay and more. The company has a database of about 5 million or more products.

An embodiment of a system and method for managing, directing, and queuing communication events uses image technology to match an image that is captured by an image sensor, such as a camera or scanner (e.g., a camera on a mobile device or a mobile scanner). The image can be any identifier including for example, a company logo (which is typically a registered trademark), a bar code, a quick response (QR) code, product image, book image or a unique image of a person on a social networking website. The image is used to identify potential queues or phone numbers the user may wish to use. To determine this, the system correlates images to queues or sets of queues. For example, if the image is a company logo, an embodiment of the system and method for managing, directing, and queuing communication events cross-references the image with a database of company contacts of people who are subject matter experts, or who have knowledge for answering questions or providing information. This person, or group of people, may be reached by mobile communication device, by telephony inside of a contact center, or by any other communications medium known in the art. The individuals, groups or divisions can be arranged on telephone queues for access by customers or requesters. In this manner, images can be used by the system and method to assist in identifying queues or phone numbers corresponding to resources who might assist the users who took the images.

Generally, the method using visual identifiers has several steps, for example it may include two or more of the following steps: (a) interpret a visual identifier, for example by scanning or reading an image or code; (b) correlate the interpreted visual to one or more phone numbers, queues or a set or queues; (c) present the phone numbers or queues to a user who provided the visual identifier; (d) receive a selection of one or more presented queues or phone numbers; (e) display estimated wait time; (f) request a call back or schedule a call back; and (g) initiate a callback. The method can be used with a variety of hardware configurations including communication devices with visual interpreters.

An embodiment of the system and method for managing, directing, and queuing communication events cross-references for variations of an interpreted image with small and medium enterprises (SMEs), individuals, or groups. For instance, an image of a blue logo corresponds to one SME, whereas the same logo in green corresponds to a different SME or group. Each logo may be a registered trademark. Key words accompanying a logo may also create variations in who or what it corresponds to. For example, once an image of a FedEx logo has been successfully identified, accompanying word(s) in the image, such as "Ground" or "Custom Critical" can be used to narrow down and segment the selection further and fine tune the list of eligible SMEs or customer service representatives who are eligible to provide information or answer questions.

Once an image is captured and cross referenced to a person or group of people who can provide information, an embodiment of the system and method for managing, directing, and queuing communication events may present queues and allow a user to submit a request for a callback.

Embodiments of the system and method for managing, directing, and queuing communication events eliminate the need to find and dial a phone number for a product, person or company when one is not available. When a question about a product or service arises, a user can simply take a picture or otherwise obtain an image of the company's logo. The image may be recognized by the image technology and cross-referenced in a database that contains a list of the company or person that owns the logo or symbol. Relevant phone numbers or queues are located and a callback may be initiated and the parties connected.

Figure 9A:
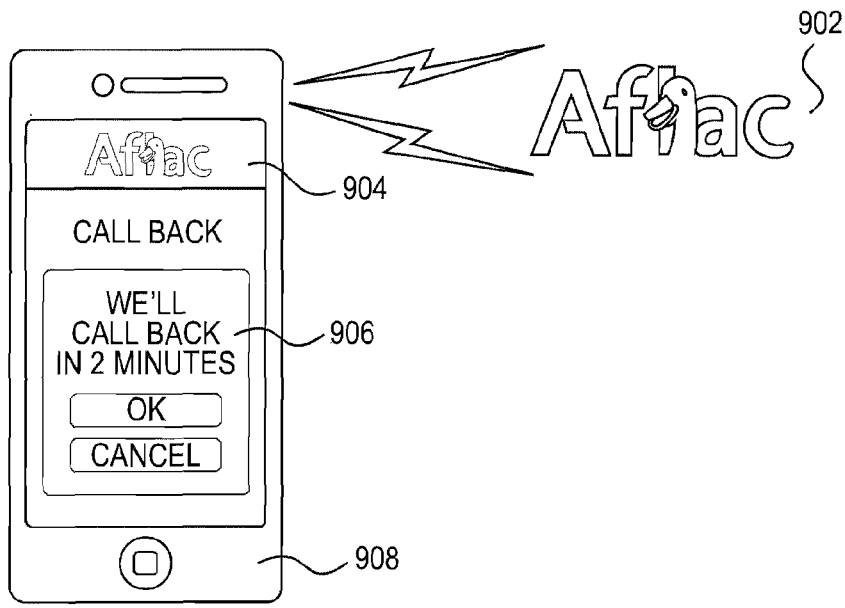
FIGS. 9A through 9E represent various exemplary communication devices adapted for operation according to various exemplary embodiments disclosed herein.

FIG. 9A illustrates an embodiment of the system for managing, directing, and queuing communication events that uses an image sensor located on a communication device 908 (e.g., a mobile communicating device) to capture an image of a company logo 902 located on, for example, a product and cross-references the captured company logo 904 with a database of company contacts. Various available queues, divisions, or individual contacts may be shown to and viewed by the user. An embodiment of the system allows a user to submit a request for a callback, determines an expected wait time 906, and places an outgoing call to the communication device 908 after the expected wait time (or an approximately equivalent time) has passed. Alternatively, an embodiment of the system places an outgoing call to another communication receiving device (not shown) having a phone number provided by the user. One skilled in the art will appreciate that the expected wait time 906 may be very brief or substantially zero, in which case a call may be placed immediately, connecting the user to a person or group of people eligible to provide information or answer questions.

Figure 9B:
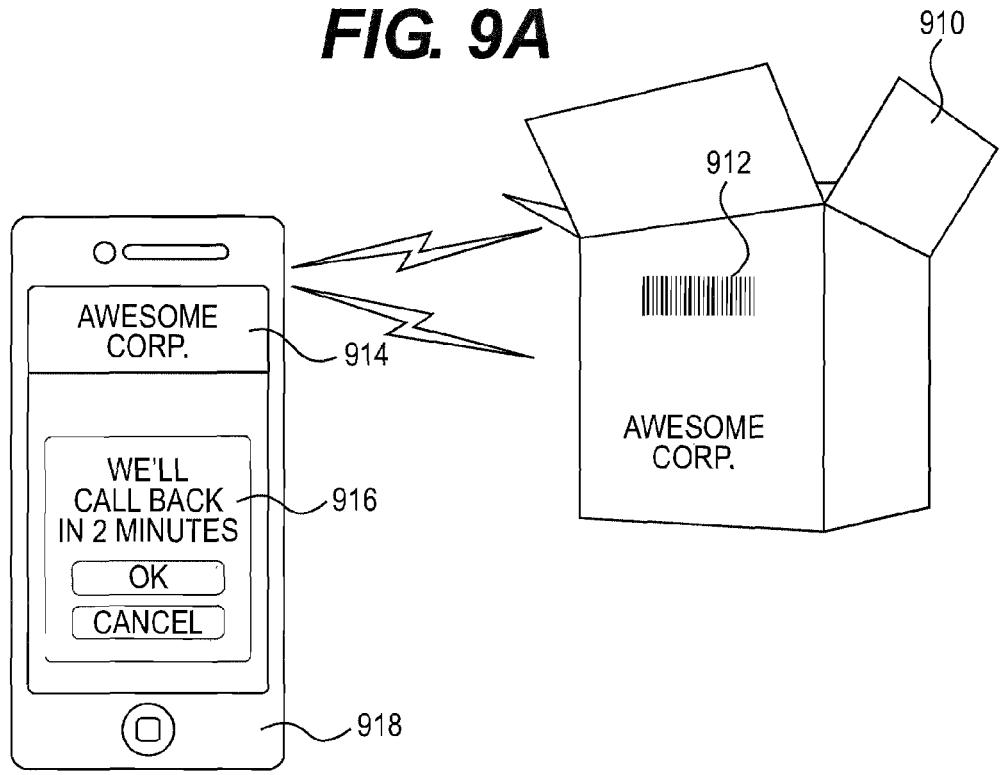

FIG. 9B illustrates an embodiment of the system for managing, directing, and queuing communication events that uses an image sensor, such as a bar code scanner, located on, for example, a communication device 918 (e.g., a mobile communication device) to scan a bar code or QR code 912 located on, for example, a product's shipping box 910. One skilled in the art will appreciate that the bar code or QR code scanner can be any scanner device, such as a stationary scanner device, a handheld scanning device, or a kiosk. Various configurations of scanners are known in the art. In some embodiments, a scanner may be removably plugged into communication device 918. An embodiment of the system retrieves company information 914 from bar code or QR code 912 and cross-references company information 914 with a database of company contacts or other relevant information associated with the company. In one embodiment, a bar code or QR code refers directly to a particular queue. In another embodiment, a bar code or QR code refers to a set of queues. An embodiment of the system allows a user to submit a request for a callback, determines an expected wait time 916, and places an outgoing call to mobile device 918 after a resource becomes available or the expected wait time (or an approximately equivalent time) has passed. Alternatively, an embodiment of the system places an outgoing call to another communication receiving device (not shown) having a phone number provided by the user. One skilled in the art will appreciate that expected wait time 916 may be very brief or substantially zero, in which case a call may be placed immediately, connecting the user to a person or group of people eligible to provide information or to answer questions.

Figure 9E:
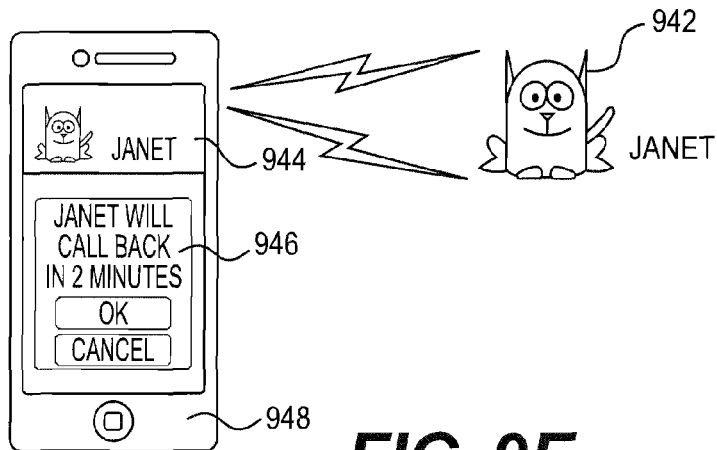
Figure 9C:
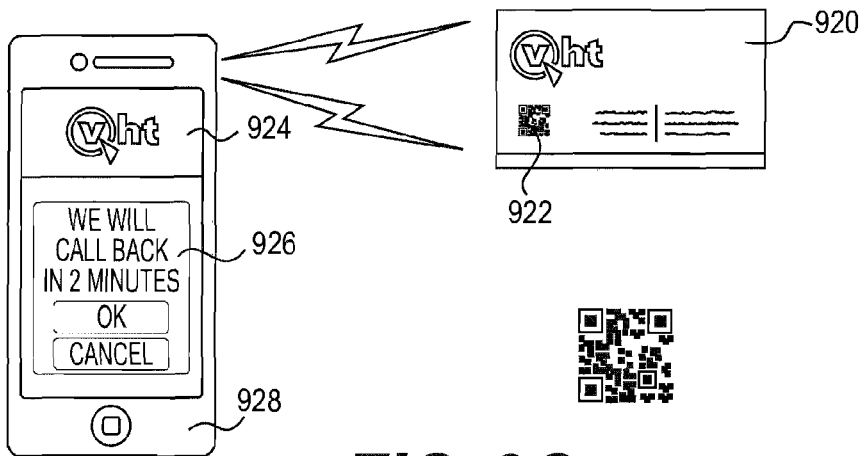

FIG. 9C illustrates an embodiment of the system for managing, directing, and queuing communication events that uses an image sensor, such as a QR code reader, located on, for example, a communication device 928 (e.g., a mobile communication device) to scan a QR code 922 located on, for example, a company's business card 920. One skilled in the art will appreciate that the QR code reader can be located on any device, such as a non-mobile device or kiosk. Various configurations of QR code readers may be used. An embodiment of the system retrieves company information 924 from QR code 922 and cross-references company information 924 with a database of company contacts or other relevant information associated with the company. In one embodiment, QR code 922 refers directly to a particular queue. In another embodiment, QR code 922 refers to a set of queues. In one embodiment, the system maintains a database of QR codes 922 with additional data associated with QR codes 922. In yet another embodiment, a third party maintains a QR code database for use by the system. An embodiment of the system allows a user to submit a request for a callback, determines an expected wait time 926, and places an outgoing call to mobile device 928 when a resource becomes available or after the expected wait time (or an approximately equivalent time) has passed. Alternatively, an embodiment of the system places an outgoing call to another communication receiving device (not shown) having a phone number provided by the user. One skilled in the art will appreciate that expected wait time 926 may be very brief or substantially zero, in which case a call may be placed immediately, connecting the user to a person or group of people eligible to provide information or to answer questions.

Figure 9D:
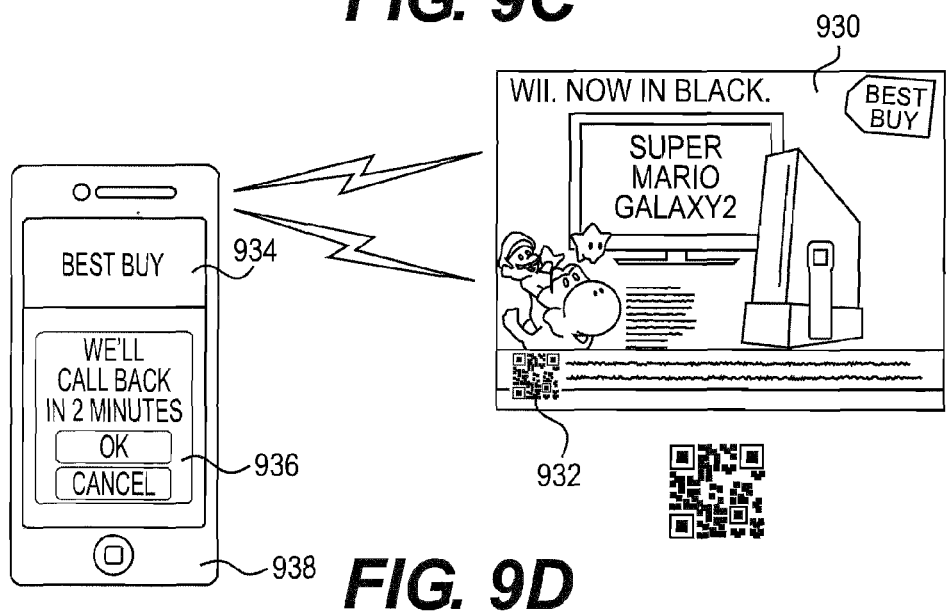

FIG. 9D illustrates an embodiment of the system for managing, directing, and queuing communication events that uses an image sensor, such as a QR code reader, located on, for example, a communication device 938 (e.g., a mobile communication device) to scan a QR code 932 located on, for example, a company's webpage 930. One skilled in the art will appreciate that a QR code reader can be located on or connected to any device, such as a non-mobile device or kiosk. A QR code or image to be read can be rendered or created by many different electronic devices such as computers, laptops, tablet/pad devices, phones and other devices with visual displays. An embodiment of the system retrieves company information 934 or product information from QR code 932 and cross-references the company information 934 with a database of company contacts or product information with a set of queues. An embodiment of the system allows a user to submit a request for a callback, determines an expected wait time 936, and places an outgoing call to mobile device 938 when a resource becomes available or after the expected wait time (or an approximately equivalent time) has passed. Alternatively, an embodiment of the system places an outgoing call to another communication receiving device (not shown) having a phone number provided by the user. One skilled in the art will appreciate that the expected wait time 936 may be very brief or substantially zero, in which case a call may be placed immediately, connecting the user to a person or group of people eligible to provide information or to answer questions.

Embodiments of the system and method for managing, directing, and queuing communication events eliminate the need for a user to research, locate and find a specialist of a company to provide information or to answer questions regarding a product. When a question about a product or service arises, a user can simply scan a bar code or QR code that is located in a store, on a brochure, on a coupon, or on an actual product, and initiate a callback from a specialist who can answer questions, provide information, or complete an order to be shipped. A specialist or other resource may be in any location including for example, a contact center, in the same store, or in a different store. Thus, a purchaser can obtain information about a particular product he is contemplating on purchasing while viewing a product at a store.

In another embodiment (not shown), a card is scanned to locate one or more available queues suitable for a user. Like the other images, data on the card may be associated either directly or indirectly to queues or groups of resources. In other words the card may be associated directly to queues or with particular people or a business group of people. Those people or groups of people typically correspond to or are related to available queues. In some embodiments queues may be created and populated de novo for each specific image-based request, depending on business rules established by a company. Virtually any type of card may be used with the system including for example, plastic, paper, magnetic, metal cards and the like, credit cards, store cards, VIP cards, money cards, gift cards, point cards, award cards, library card, cards associated with products or devices such as a doll's ID card or an automobile card, and cards associated with services. Moreover, in some embodiments images that may be used to trigger one or more methods of the invention, or that may be used in conjunction with a system according to the invention, images are placed on or in documents such as word processing documents, spreadsheets, web sites, or emails, and may thereby enable documents to be used directly to initiate service or communications with a related business using systems or methods according to the invention.

An image device, or more particularly a card scanner, may be used to read data from the card. Data from the card may be sent to a central location which accesses information stored or displayed on, or pertaining to, the card, and relates it to one or more queues or groups of resources. Information about queues or groups may be sent to the user. A session queuing component displays the associated queues to the user. Estimated wait time information may or may not be made available to the user. Using this queue information, the user is able to select a desired queue or queues. A callback or scheduled call can then be arranged. As with the other embodiments, the card reader may be portable, handheld or stationary. Various types of card readers and card combinations may be used.

FIG. 9E illustrates an embodiment of the system for managing, directing, and queuing communication events that uses an image sensor located on a communication device 948 (e.g., a mobile communicating device) to capture a registered personal image 942 of an individual posted on a social networking website, for example. Individuals can register their own unique image, similar to a Facebook Avatar, in a database. The database of registered individual images and the registration process may be a standalone system or may be hosted on an embodiment of the system for managing, directing, and queuing communication events. The unique image may be placed on various media including electronic, paper, metal, plastic, and fabric for example a tablet computer, a poster, tote bag, brochure, coupon, pen, shirt or a business card. Moreover, in some embodiments unique user images that may be used to trigger one or more methods of the invention, or that may be used in conjunction with a system according to the invention, images are placed on or in documents such as word processing documents, spreadsheets, web sites, or emails, and may thereby enable documents to be used directly to initiate service or communications with a related business using systems or methods according to the invention. An embodiment of the system cross-references the captured personal image 944 with a database of registered personal images. The image may represent a particular individual or may represent a product, division, or company. An embodiment of the system allows a user to submit a request for a callback from the individual with the registered personal image 942, determines an expected wait time 946, and places an outgoing call to the communication device 948 after the expected wait time (or an approximately equivalent time) has passed. Alternatively, an embodiment of the system places an outgoing call to another communication receiving device (not shown) having a phone number provided by the user. One skilled in the art will appreciate that the expected wait time 946 may be very brief or substantially zero, in which cases a call may be placed immediately, connecting the user to the individual with the registered personal image 942.

Embodiments of the system and method for managing, directing, and queuing communication events eliminate the need for an individual to give out a phone number. Individuals can pass out business cards with a registered personal image 942. Individuals can change a personal image and re-register it to change how people contact him or her, similar to changing the individual's phone number.

An embodiment of the system may be in a callback cloud that bridges a user who requests a callback and an individual from whom a callback is requested.

An embodiment of the system provides a database and directory for looking up people's personal images, similar to a phone book. Individuals who register their personal images may have an online account in a hosted system. An individual may log into his or her online account and may change his or her personal image and the preferences of communication, e.g., via phone, email, text message, or instant message. The database may also include companies, their registered logos and symbols, and variations of said logos that include accompanying words or images.

An embodiment of the system may add a special symbol to any QR code, bar code, company logo, or personal unique image that indicates that a particular QR code, bar code, company logo, or personal unique image triggers or pertains to a callback for a user and connects the user to a relevant person.

Figure 10:
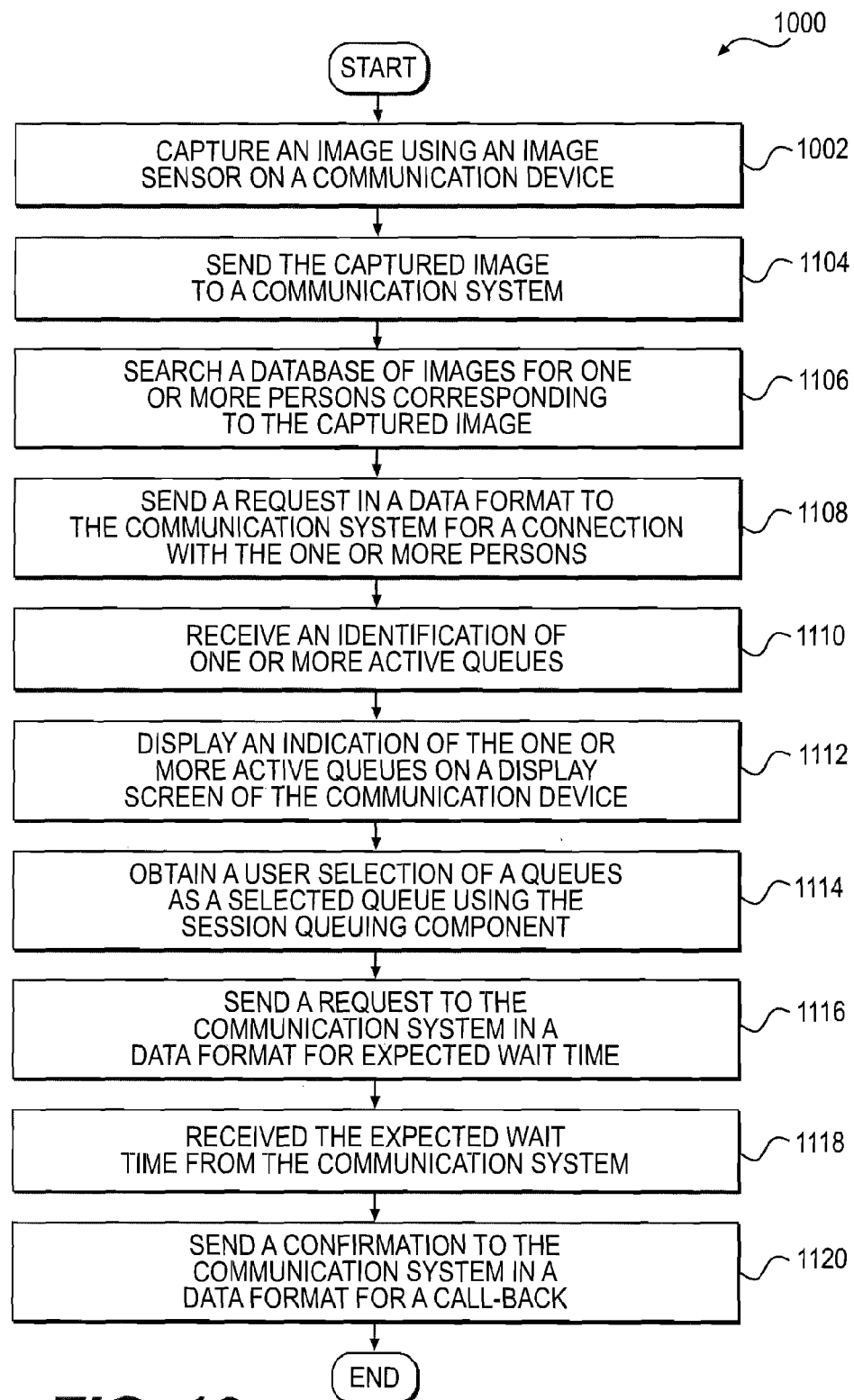
FIG. 10 is a flow chart illustrating a method and/or procedures for initiating a call-back sequence using image technology, according to one or more exemplary embodiments disclosed herein.

FIG. 10 is a flow chart illustrating an embodiment of a method 1000 for initiating a call-back sequence using image technology. The method 1000 starts by capturing an image using an image sensor. The image sensor may be on a communication device (block 1002), connected to a communication device or simply work with a communication device. The method 1000 then sends the captured image to a communication system (block 1104), searches a database of images for one or more persons or queues corresponding to the captured image (block 1106), sends a request in a data format to the communication system for a connection with the one or more persons (block 1108), and receives an identification of one or more active queues (block 1110). The method 1000 further displays an identification of the one or more active queues on a display screen of the communication device using a session queuing component that resides within the communication device (block 1112), obtains a user selection of a queue as a selected queue using the session queuing component (block 1114), sends a request to the communication system in a data format for expected wait time (bock 1116), receives the expected wait time from the communication system (block 1118), and sends a confirmation to the communication system in a data format for a call-back (block 1120).

In an embodiment of the method 1000, the image sensor is a camera located on a mobile device.

In an embodiment of the method 1000, the image sensor is a mobile scanner.

In an embodiment of the method 1000, the image is a company logo.

In an embodiment of the method 1000, the image is a bar code located on a product box.

In an embodiment of the method 1000, the image is placed on or in a document such as a word processing document, a spreadsheet, a web site, or an email, and thereby enables the document to be used directly to initiate service or communications with a related business.

In an embodiment of the method 1000, the image sensor is a quick response (QR) code reader and the image is a QR code.

In an embodiment of the method 1000, the image is a registered personal image of an individual posted on a social networking website.

An embodiment of the method 1000 may further cross-reference images that are stored in a database of registered personal images.

In another embodiment, the system uses facial recognition software to identify the individual in a captured image. The recognized person is then located in a database and a corresponding queue is located. Alternatively, once the recognized person's communication information is found, the recognized person may be called directly. The database of persons can be located at the communication device, at the central system or at a third location.

The above described system represents an exemplary embodiment of a connection system for sequencing communication device identifiers in a selected queue for connection to a service agent of a group of service agents at a business communication center. The present invention includes all such equivalents and modifications, and is limited only by the scope of the following claims.

The invention claimed is:

1. An apparatus for initiating a voice call-back sequence using image technology, comprising:
   an image sensor capable of capturing an image;
   a processor configured to execute a device application, wherein execution of the device application causes the apparatus to:
   send a request to a communication system in a data format for a list of active providers, and receive a list of a plurality of active providers;
   send a request to the communication system in a data format for an identification of active queues associated with at least one of the plurality of active providers, and receive an identification of the active queues;

sends data related to the captured image to the communication system, wherein the data related to the captured image is relevant to at least one of identification of active queues and identification of active providers; and sends a confirmation in a data format for a voice call-back to the communication system.

2. The system apparatus of claim 1, wherein execution of the device application causes the apparatus to display an indication of the expected wait time and obtain a user selection of one of a confirmation command and a cancel command.

3. The apparatus of claim 2, wherein execution of the device application further causes the apparatus to generate a confirmation message to the communication system in response to a user selection of the confirmation command, the confirmation message comprising a communication receiving device identifier and a request to add the device identifier to a selected queue.

4. The apparatus of claim 3, wherein the identifier is a telephone number.

5. The apparatus of claim 3, wherein the identifier is a network or service address.

6. The apparatus of claim 1, wherein the image sensor is a camera located on a mobile device.

7. The apparatus of claim 1, wherein the image sensor is a mobile scanner that can be removably plugged into the communication device.

8. The apparatus of claim 1, wherein the image is a company logo.

9. The apparatus of claim 1, wherein the image is a bar code located on a product package.

10. The apparatus of claim 1, wherein the image is a QR code.

11. The apparatus of claim 10, wherein the QR code is located on a company webpage.

12. The apparatus of claim 10, wherein the QR code is located on one or more of business cards, plastic cards, paper cards, magnetic cards, metal cards, credit cards, store cards, VIP cards, money cards, gift cards, point cards, award cards, library cards, and cards associated with products or devices, and cards associated with services.

13. The apparatus of claim 10, wherein the QR code relates to a particular queue.

14. The apparatus of claim 10, wherein the QR code relates to a set of queues.

15. The apparatus of claim 1, wherein execution of the device application causes the image to be associated with a document such that the document can be used directly to initiate service or communications with a related entity.

16. The apparatus of claim 1, wherein execution of the device application causes the apparatus to obtain the image from a social networking website.

17. The apparatus of claim 16, wherein execution of the device application causes the apparatus to cross-references images that are stored in a database of personal images.

18. A method for initiating a call-back sequence using image technology, the method comprising:

sending data related to a captured image to a communication system, wherein the data is relevant to at least one of identification of active queues and identification of active providers by the communication system;

sending a request in a data format to the communication system for a list of active providers:

receiving an identification of a plurality of active providers from the communication system;

sending a request to the communication system in a data format for a list of active queues associated with at least one of the plurality of active providers;

receiving an identification of the active queues;

displaying an indication of the active queues on a display screen of the communication device using a session queuing component that resides within the communication device;

obtaining a user selection of a queue using the session queuing component; and sending a confirmation to the communication system in a data format for a call-back.

19. The method of claim 18, further comprising:

sending a request to the communication system in a data format for expected wait time;

receiving the expected wait time from the communication system; and displaying an indication of the expected wait time and obtaining a user selection of one of a confirmation command and a cancel command.

20. The method of claim 18, further comprising capturing the image by a camera located on a mobile device.

21. The method of claim 18, further comprising capturing the image by a mobile scanner.

22. The method of claim 18, wherein the image is a company logo.

23. The method of claim 18, wherein the image is a bar code located on a product package.

24. The method of claim 18, wherein the image is a QR code.

25. The method of claim 18, further comprising obtaining the image from a social networking website.

26. The method of claim 18, further comprising cross-referencing images that are stored in a database of registered personal images.

27. The method of claim 18, further comprising associating the image with a document such that the document can be used directly to initiate service or communications with a related entity.

28. A non-transitory computer readable medium for storing computer executable instructions for initiating a call-back sequence using image technology, comprising instructions that configure a communication device to:

Sending a captured image to a communication system, wherein the image is relevant to at least one of identification of active queues and identification of active providers by the communication system;

send a request to a communication system in a data format for a list of active providers and receive from the communication system a list of a plurality of active providers;

send a request to the communication system in a data format for an identification of active queues associated with at least one of the plurality of active providers, and receive an identification of the active queues;

display an indication of the one or more active queues on a display screen of the communication device using a session queuing component that resides within the communication device;

obtain a user selection of a queue as a selected queue using the session queuing component; and send a confirmation to the communication system in a data format for a call-back.

29. The non-transitory computer readable medium of claim 28, wherein the computer executable instructions further configure the communication device to:

send a request to the communication system in a data format for an expected wait time;

receive the expected wait time from the communication system;

display a confirmation control on a display screen of the communication device, wherein the confirmation control displays an indication of the expected wait time; and obtain a user selection of one of a confirmation command and a cancel command.

30. A communication system for receiving incoming communications data related to an image from a communication device and initiating a call-back, the system comprising:

a search component configured to receive from a communication device data related to a captured image and initiate a database search for information corresponding to the data related to the image;

a sequence component configured to communicate with a communication device, including:

receiving a request to identify a plurality of active providers and a request to identify active queues associated with at least one of the plurality of active providers;

sending a list of the plurality of active providers and an indication of active queues associated with the at least one of the plurality of active providers, wherein at least a portion of the sent active provider and active queue information is determined based on the result of the database search related to the image;

receiving an identification of a selected queue;

the sequence component being further configured to confirm a call-back and initiates a call-back sequence to a communication receiving device;

a queue component having more than one queue and configured to assign a placeholder associated with a communication receiving device in the selected queue; and a call-back component configured to place an outgoing call to the communication receiving device-in response to the sequence component;

wherein each of the search component, sequence component, queue component, and call-back component are embodied as one or more of at least one processor and a non-transitory computer-readable medium.

31. The communication system of claim 30, wherein the search component is further configured to uses facial recognition to identify an individual in the captured image.

32. The communication system of claim 30, wherein the database is located at the communication device.

33. The communication system of claim 30, wherein the database is located at the communication system.

34. The communication system of claim 30, wherein the database is located at a third location.

35. A method for a communication system that receives incoming communications from a communication device has queues, and will call-back to a communication receiving device, the method comprising:

receiving from a communication device data related to a captured image and an identifier associated with the communication device;

initiating a database search for information corresponding to the data related to the captured image;

selecting active queues associated with at least one of a plurality of active providers based on at least one of the received data related to the captured image and the result of the database search;

sending information about the active queues to the communication device;

receiving, from the communication device, a selected queue desired for the identifier;

assigning a placeholder for the identifier in the selected queue; and based on a call back request being received from the communication device, initiating a call back to the communication receiving device based upon the assigned placeholder in the selected queue.

36. A non-transitory computer readable medium for storing computer executable instructions for initiating a call-back sequence using image technology, the computer executable instructions configuring a communication system to:

receive from a communication device data related to a captured image and an identifier associated with the communication device;

initiate a database search for information corresponding to the data related to the captured image;

select active queues associated with at least one of a plurality of active providers based on at least one of the received data related to the captured image and the result of the database search;

send information about the active queues to the communication device;

receive from the communication device, the selected queue desired for the identifier;

assigning a placeholder for the identifier in the selected queue; and based on a call back request being received from the communication device, initiate a call back to the communication receiving device based upon the assigned placeholder in the selected queue.

37. The communication system of claim 30, wherein the captured image comprises a QR code and the result of the database search comprises information associated with the QR code.

38. The method of claim 35, wherein the captured image comprises a QR code and the result of the database search comprises information associated with the QR code.

39. The non-transitory computer readable medium of claim 36, wherein the captured image comprises a QR code and the result of the database search comprises information associated with the QR code.

* * * * *